United States Patent Office 2,790,794
Patented Apr. 30, 1957

2,790,794

METHOD OF PREPARING ISOBUTYRIC ACID ESTERS OF CELLULOSE

Carl J. Malm, Leo J. Tanghe, and Loring W. Blanchard, Jr., Rochester, N. Y., assignors to Eastman Kodak Company, Rochester, N. Y., a corporation of New Jersey No Drawing. Application November 18, 1954, Serial No. 469,832

5 Claims. (Cl. 260—227)

This invention relates to a method of preparing isobutyric acid esters of cellulose in which the catalyst is uniformly distributed throughout the cellulose prior to esterification.

Isobutyric acid esters of cellulose of good qualities are difficult to prepare by conventional esterification procedures in which sulfuric acid is employed as the catalyst. If the sulfuric acid is added in admixture with isobutyric acid before the addition of the isobutyric anhydride the sulfuric acid is quantitatively absorbed by the cellulose which is first contacted therewith and the isobutyric anhydride when added combines only with the fibers in which the sulfuric acid is absorbed. The transesterification of the combined sulfuric acid is very slow and the first esterified cellulose is badly degraded before the last part of the fibers comes in contact with the catalyst and becomes esterified. If the sulfuric acid is added with isobutyric anhydride it will combine chemically with the cellulose with which it first comes in contact and the same disadvantages as described above will result.

One object of our invention is to provide a method of treating cellulose with the catalyst in which uniform distribution of the catalyst is obtained throughout the cellulose mass rather than in only those portions which are first contacted thereby. Another object of our invention is to avoid undesirable degradation of the cellulose such as takes place if conventional esterification procedures are used in the making of isobutyric acid esters of cellulose. Other objects of our invention will appear herein.

In the manufacture of isobutyric acid esters of cellulose in accordance with our invention the cellulose is first activated by a treatment in which the cellulose fibers are swollen with water and the water on the swollen fibers is then displaced by means of lower fatty acid such as either directly by means of isobutyric acid or by means of acetic acid followed by displacement of the acetic acid with isobutyric acid. This method of activating cellulose is conveniently carried out by treating the cellulose in the form of a sheet by passing water either at ordinary or elevated temperature through the sheet aided by suction and further along in the path through which the sheet passes treating with further liquid such as isobutyric acid or acetic acid followed by isobutyric acid to displace the water so that in the end an activated cellulose is obtained which is wet with isobutyric acid. One method of activation which is suitable for use in our invention is that which has been described and claimed in Richter, Perkins, and Herdle Patent No. 2,622,080 in which isobutyric acid is employed as the butyric acid component of the procedure described. The cellulose to be esterified in accordance with our invention may be any cellulose which has been activated by a procedure involving water swelling of the cellulose and replacement of the water with organic liquids preferably with the final liquid present in the cellulose being predominantly isobutyric acid and with the water substantially removed therefrom.

After the cellulose has been activated and while kept in swollen condition by means of isobutyric acid it is treated with a composition of isobutyryl sulfuric acid at a moderate temperature and with a restricted amount of isobutyric anhydride. The liquid with which the cellulose is treated is prepared by mixing together sulfuric acid, isobutyric acid and isobutyric anhydride. The amount of sulfuric acid employed should be at least 1% and not over 10% based on the weight of the bone dry cellulose, 5% being a convenient amount. The isobutyric anhydride employed should not be over 50% of the mixture of isobutyric acid and isobutyric anhydride. The sulfuric acid and the isobutyric anhydride is allowed to react whereby the sulfuric acid is all converted to isobutyryl sulfuric acid. The conversion of all the sulfuric acid to isobutyryl sulfuric acid takes place in a short time such as 5 or 10 minutes and the cellulose is then mixed therewith restricting the temperature and the concentration of isobutyric anhydride so that substantially no esterification occurs. The anhydride should be limited to not more than 20% of the total liquid on the cellulose. The temperature is kept below 80° F. and preferably below 60° F. In this mixing operation the catalyst is uniformly distributed throughout the cellulose without any esterifying action occurring.

After the catalyst has been thoroughly distributed throughout the cellulose additional quantities of isobutyric anhydride, are added, the temperature is raised and the esterification proceeds uniformly. The amount of isobutyric anhydride employed in preparing the isobutyryl sulfuric acid should be no more than 1 part thereof per part of cellulose. After the distribution of the catalyst in the cellulose there is added thereto sufficient isobutyric anhydride to constitute at least 3½ and preferably at least 4 parts of isobutyric anhydride per part of cellulose, and the temperature is gradually increased up to a maximum of 110°–120° F. for the esterification, whereby isobutyryl is imparted to the cellulose. Our invention relates to the preparation of both cellulose esters in which all of the acyl imparted to the cellulose is isobutyryl and esters in which the major portion of the acyl combined with the cellulose is isobutyryl together with a minor proportion of lower fatty acid groups such as acetyl, propionyl or normal butyryl. In cases where other acyl groups are desired, a small proportion of the corresponding acid or anhydride may be present in the reaction mass.

The following example illustrates the preparation of isobutyric acid esters of cellulose in accordance with our invention:

*Example*

Cotton linters were activated by soaking in distilled water at 150° F. The excess water was removed from the cotton linters by centrifuging and the water retained therein was displaced by 1 change of acetic acid which was in turn displaced with 3 changes of isobutyric acid. A Werner-Pfleiderer mixer was charged with 0.8 lb. of the activated cellulose wet with 0.7 lb. of isobutyric acid. A mixture made up in the following proportions was allowed to react for 5 minutes, cooled to 50° F. and was mixed with the activated cellulose.

6 lbs. isobutyric acid
0.6 lb. isobutyric anhydride
6 cc. sulfuric acid

After mixing for 15 minutes at room temperature the excess liquid was removed therefrom by centrifuging. The thus treated cellulose in which the catalyst was uniformly distributed was returned to the mixer and was esterified by adding thereto 1220 grams of isobutyric anhydride and 150 grams of acetic anhydride, increasing the jacket temperature from 70° to 110° F., the esterification taking place over a period of 5.75 hours. Upon the completion of the esterification there was slowly added to the esterification mass a mixture of 200 cc. of water and 800 cc. of acetic acid, the jacket temperature of the mixer being 110° F. After diluting the esterification mass with aqueous acetic acid, the product was precipitated by slowly pouring the mass into agitated distilled water. The resulting precipitate was washed with distilled water. The product obtained contained 16% acetyl and 35% isobutyryl and had an intrinsic viscosity of 0.95 in glacial acetic acid.

The product thus obtained was useful for making cellulose ester products such as plastic compositions, coating compositions, sheets, or the like, after mixing with plasticizer, by shaping at elevated temperatures or coating out from volatile solvents.

We claim:

1. A process for preparing cellulose esters having a high isobutyryl content which comprises activating cellulose with a swelling agent removing the swelling agent by acid displacement so as to obtain an activated cellulose wet with isobutyric acid, thoroughly mixing the cellulose wet with isobutyric acid with a solution substantially free of sulfuric acid, of isobutyryl sulfuric acid in isobutyric acid, the temperature and anhydride content being restricted so that substantially no esterification occurs and after the isobutyryl sulfuric acid and the cellulose are thoroughly mixed, esterifying the cellulose with a bath in which isobutyric anhydride is the principal esterifying reagent.

2. A process for preparing cellulose esters having a high isobutyryl content which comprises activating cellulose by swelling with water, removing the water from the cellulose by displacement with acetic acid and displacement of the acetic acid with isobutyric acid thereby forming an activated cellulose wet with isobutyric acid, thoroughly mixing the activated cellulose with a solution of isobutyryl sulfuric acid in isobutyric acid which solution is substantially free of sulfuric acid, the temperature and anhydride being so restricted that substantially no esterification occurs and after the cellulose is thoroughly mixed with the isobutyryl sulfuric acid esterifying it with a bath in which isobutyric anhydride is the principal esterifying reagent.

3. A process for preparing cellulose esters having a high isobutyryl content which comprises activating cellulose with water, removing the water from the cellulose with isobutyric acid, thoroughly mixing the activated cellulose wet with isobutyric acid with a solution of isobutyryl sulfuric acid in isobutyric acid, which solution is substantially free of sulfuric acid, the temperature and anhydride contents being so restricted that substantially no esterification occurs and esterifying the cellulose, thoroughly mixed with the isobutyryl sulfuric acid, with a bath in which isobutyric anhydride is the principal esterifying reagent therein.

4. A process for preparing cellulose esters having a high isobutyryl content which comprises activating cellulose with water, removing the water from the cellulose by acid displacement whereby an activated cellulose wet with isobutyric acid is obtained, thoroughly mixing the thus obtained cellulose with a solution of isobutyryl sulfuric acid in isobutyric acid which solution is substantially free of sulfuric acid, the temperature and anhydride being restricted so that no esterification occurs, then esterifying the cellulose with a bath containing isobutyryl and acetyl groups, the principal esterifying reagent being isobutyric anhydride, the acetyl present being not more than 20% of the total acyl content therein.

5. A process for preparing cellulose esters having a high isobutyryl content which comprises activating cellulose with water, dehydrating the cellulose with acetic acid and then displacing acetic acid therefrom with isobutyric acid whereby an activated cellulose wet with isobutyric acid is obtained, thoroughly mixing the thus obtained cellulose with a solution of isobutyryl sulfuric acid in isobutyric acid, which solution is substantially free of sulfuric acid, the temperature and anhydride being restricted so that substantially no esterification occurs and then esterifying the cellulose thoroughly mixed with the isobutryl sulfuric acid with a bath containing isobutyryl and acetyl groups, in which isobutyric anhydride is the principal esterifying agent and acetyl comprises no more than 20% of the total acyl therein.

References Cited in the file of this patent

UNITED STATES PATENTS

| | | |
|---|---|---|
| 2,048,685 | Clark et al. | July 28, 1936 |
| 2,478,396 | Hincke et al. | Aug. 9, 1949 |
| 2,622,080 | Richter et al. | Dec. 16, 1952 |